US005251875A

United States Patent [19]

Craychee et al.

[11] Patent Number: 5,251,875

[45] Date of Patent: Oct. 12, 1993

[54] LIFTING DEVICE FOR VEHICLE PARTS

[75] Inventors: John F. Craychee, St. Chalres, Ill.; Peter Symon, Munising, Mich.

[73] Assignee: Kiene Diesel Accessories, Inc., Addison, Ill.

[21] Appl. No.: 898,352

[22] Filed: Jun. 12, 1992

Related U.S. Application Data

[60] Continuation-in-part of Ser. No. 734,651, Jul. 23, 1991, abandoned, which is a division of Ser. No. 14,639, Feb. 13, 1987, Pat. No. 5,033,717.

[51] Int. Cl.[5] .......... B60P 1/48

[52] U.S. Cl. .......... 254/8 B; 254/124; 254/133 R; 254/134

[58] Field of Search .......... 254/8 B, 8 R, 124, 133 R, 254/134, DIG. 4; 269/17

[56] References Cited

U.S. PATENT DOCUMENTS

| | | | |
|---|---|---|---|
| 995,583 | 6/1911 | Willour | 254/DIG. 4 |
| 1,325,962 | 12/1919 | Templeton | 254/DIG. 4 |
| 1,751,480 | 3/1930 | Howell . | |
| 2,637,523 | 5/1953 | Lucker | 254/99 |
| 3,087,630 | 4/1963 | Karnow et al. . | |
| 4,523,888 | 6/1985 | Pezzner et al. | 254/8 B |
| 4,549,722 | 10/1985 | Gagliano | 254/134 |
| 4,607,823 | 8/1986 | Thomas | 254/134 |
| 5,033,717 | 7/1991 | Symon | 254/8 B |

FOREIGN PATENT DOCUMENTS

| | | | |
|---|---|---|---|
| 382998 | 11/1932 | United Kingdom | 254/8 B |

OTHER PUBLICATIONS

*OTC New Product News,* OTC Division, SPX Corporation, 1991.

*Primary Examiner*—Bruce M. Kisliuk
*Assistant Examiner*—Eileen P. Morgan
*Attorney, Agent, or Firm*—Dykema Gossett

[57] ABSTRACT

A first embodiment of a lifting device is provided for facilitating installation and removal of a plurality of vehicle parts base and a boom pivotally comprises a castered mounted to the base through a horizontal axis of rotation by a mast. A hydraulic jack mounted to a between the base and the boom effects pivotal movement of the boom between upper and lower positions. A receiver is rotatably mounted on a horizontal axis of rotation to a rear portion of the boom. A tie rod pivotably mounted to and between the mast and the receiver guides the receiver through rotational movement and maintains the same in a horizontal condition as the boom moves between the upper and lower positions. The receiver is adapted to interchangeably mount on a vertical axis of rotation one of a plurality of vehicle part attachments, such as a cradle attachment, a flywheel attachment or a clutch attachment adjustably mounting through vertical and horizontal axes of rotation a starter, a flywheel or a clutch, respectively. In this manner, the device is adapted to interchangeably mount for universal adjustment in a variety of directions in three-dimensional space, a plurality of vehicle parts so as to facilitate the installation and removal of the same. A second embodiment of the lifting device is also disclosed which includes a more compact vertical profile and other improvements.

20 Claims, 6 Drawing Sheets

LIFTING DEVICE FOR VEHICLE PARTS

RELATED APPLICATIONS

This application is a continuation-in-part of U.S. patent application Ser. No. 734,651 filed Jul. 23, 1991, now abandoned, which is a division of U.S. patent application Ser. No. 014,639 filed Feb. 13, 1987 and now U.S. Pat. No. 5,033,717.

FIELD OF THE INVENTION

The invention relates to a device for supporting work pieces and more particularly to a device for facilitating, removing and installing a variety of vehicle parts.

BACKGROUND OF THE INVENTION

It is common knowledge that after a certain amount of usage of commercial and recreational vehicles, operative parts thereof, including flywheels, clutches, starters, transmissions, drive shafts, bell housings and the like, wear or breakdown and are therefore in need of repair or replacement. Because of the weight, size and shape of such parts, and the confined space in which a mechanic must ordinarily work, handling of such parts, when being removed or installed is a cumbersome, strenuous, and dangerous task unless a properly designed mechanical device is employed.

A conventional mechanical or hydraulic jack is generally unsatisfactory for this purpose because of its failure to provide adequate support for parts of irregular shape, with the resulting danger that the removed part may topple from the jack and injure the mechanic. In addition, use of the conventional jack has been objectionable because such devices have required laborious and time-consuming efforts of the mechanic and usually require that the same be assisted by another mechanic or helper in removing or installing the automotive part being replaced or repaired due to the fact that such jacks do not provide a means to adjustably guide the part upon the jack so that it may be lifted and returned to its original position. Accordingly, use of these prior art jacks are costly due to the relatively high costs of labor. Also, conventional jacks are ordinarily limited to movement in vertical directions.

Devices which overcome the foregoing and other drawbacks of conventional hydraulic jacks are known. For example, U.S. Pat. No. to Tesinsky, 3,948,484, issued Apr. 6, 1976, discloses a device to be used in conjunction with a conventional hydraulic jack and for removing a transfer case from an automobile transmission. The device comprises a base mountable to the hydraulic jack and a cradle plate pivotally connected to the base for movement about a horizontal axis of rotation. To remove the crank case from the transmission, the base is mounted over the extensible portion of the jack and the same is raised until the cradle plate engages the crank case and is securely mounted thereto. Subsequently, the plate is pivoted downwardly to tilt the crank out of the way of obstructing parts of the automobile, and then the crank is transported on the jack to a work area for repair.

In addition, U.S. Pat. No. to Hanscom, 4,118,010, issued Oct. 3, 1978, discloses a lifting device comprising, in relevant part, a castered base, an upright support mounted to one side of the base and a boom adapted to pivotally attach to upper or lower portions of the upright support for vertical movement with respect thereto. A hydraulic cylinder is used for actuating pivotal movement of the boom. When the boom is mounted to the top portion of the upright support, the boom functions as a hoist and for this purpose is provided with a hook, chain or cable for lifting. When the boom is mounted to the bottom portion of the upright support, the boom functions as a jacking device for removing and installing automobile transmissions and the like and for this purpose is provided with a cradle tiltably mounted at the rear end of tile boom. The cradle can be adjusted to fit various types of transmissions, gear boxes or the like and can be raised or lowered while maintaining a predetermined level relative to the horizontal.

Further, U.S. Pat. No. to Hamlin, 2,643,779, issued Jan. 15, 1949, discloses a jack for handling transmissions and the like during installation and removal of the same and comprising a castered base, a frame at one end of the base, and an arm pivotally secured to the frame. A pneumatic cylinder is secured to and between the frame and the arm and actuates vertical movement of the arm. A cradle is pivotally mounted to the free end of the arm for rotation in the plane of movement of the arm. The transmission is adapted to mount to the cradle. In this manner, the cradle is rotatably adjustable independent of the arm.

Although the devices disclosed above may overcome some of the disadvantages associated with conventional jacks, they are not without their own drawbacks. Many of these devices include a boom pivotally mounted to a base and a support pivotally mounted to the free end of the boom to permit the support to maintain a horizontal condition when the boom is moved between upper and lower positions. The support, however, is only rotatable through a horizontal axis of rotation. In addition, although in some instances the support may be adjusted to mount more than one type of automotive part, as disclosed above by Hanscom, in the majority of cases, only one support is provided. Thus, the support is, by its very nature, limited to the types of parts which it can safely accommodate.

Therefore, it is desirable to provide a lifting device for automotive parts and including a vertically adjustable boom adapted to adjustably mount a variety of automotive part attachments for movement through horizontal, vertical, and diagonal axes of rotation. In addition, it is desirable to adapt the supports to mount, for secure custom-fit attachment, a variety of automotive parts. In this manner, a device provides for universal adjustment in a variety of directions in three-dimensional space and attains universal application to large numbers, sizes, and shapes of automotive parts in need of replacement or repair.

SUMMARY OF THE INVENTION

In accordance with one aspect of the present invention, a clutch installation device is provided for facilitating removing and installing vehicle clutches. The device comprises a base, a boom having front and rear portions. The boom is pivotally mounted to the base at the front portion of the boom for accomplishing pivotal movement of the boom about a horizontal axis of rotation. A hydraulic cylinder is mounted between the boom and the base for moving the boom about the horizontal axis of rotation. A spline shaftes rotatingly mounted to the rear portion of the boom for engaging a spline portion of a clutch. The spline is adapted to pivot within the rear portion of the boom thereby allowing the spline to be rotated to engage the splined portion of the clutch while the clutch is attached to a vehicle.

In a preferred embodiment of the present invention, the boom is comprised of two sections wherein the two sections are joined at obtuse angles. This feature allows the boom to assume a vertical height profile which is lower than that which could be achieved using a conventional straight boom. This lower profile allows the installation device of the present invention to be more easily maneuvered around vehicle gas tanks, and the like. The lower profile also permits the mechanic to work beneath vehicles without necessitating lifting the vehicle, or, in some cases, lifting the vehicle only slightly.

In yet another preferred embodiment of the present invention, the spline shaft is hingedly connected to the rear portion of the boom so that the spline shaft can be moved between horizontal and vertical positions. When the spline shaft is in the vertical position, it easy for a clutch to be loaded on, or taken off, the spline shaft. Once the clutch is loaded onto the spline shaft and the installation device is maneuvered under the vehicle, the spline shaft is pivoted to its horizontal orientation wherein the clutch is easily maneuvered against and fastened to the vehicle engine.

In a second embodiment of the present invention, a device is provided for facilitating removal and installation of vehicle components. The device comprises a base and a boom. The a boom includes front and rear portions. The boom is mounted at the front portion to the base for achieving pivotal movement about a horizontal axis of rotation. A hydraulic cylinder is mounted between the base and the boom for effecting pivotal movement of said boom about the horizontal axis of rotation. A receiver block is mounted to the rear portion of the boom for engaging one of a plurality of attachment apparatus. The receiver means and the rear portion of the boom both include an upper most portion wherein the upper most portion of the receiver block resides generally below the upper most portion of the rear portion of the boom. This relationship between the receiver block and the rear portion of the boom ensures that the device of the present invention will be capable of orienting a clutch such that minimal, if any, elevation of the vehicle is necessary during installation or removal of the vehicle clutch.

BRIEF DESCRIPTION OF THE DRAWINGS

The invention will now be described with reference to the drawings in which.

DESCRIPTION OF THE PREFERRED EMBODIMENTS

Figure 1:
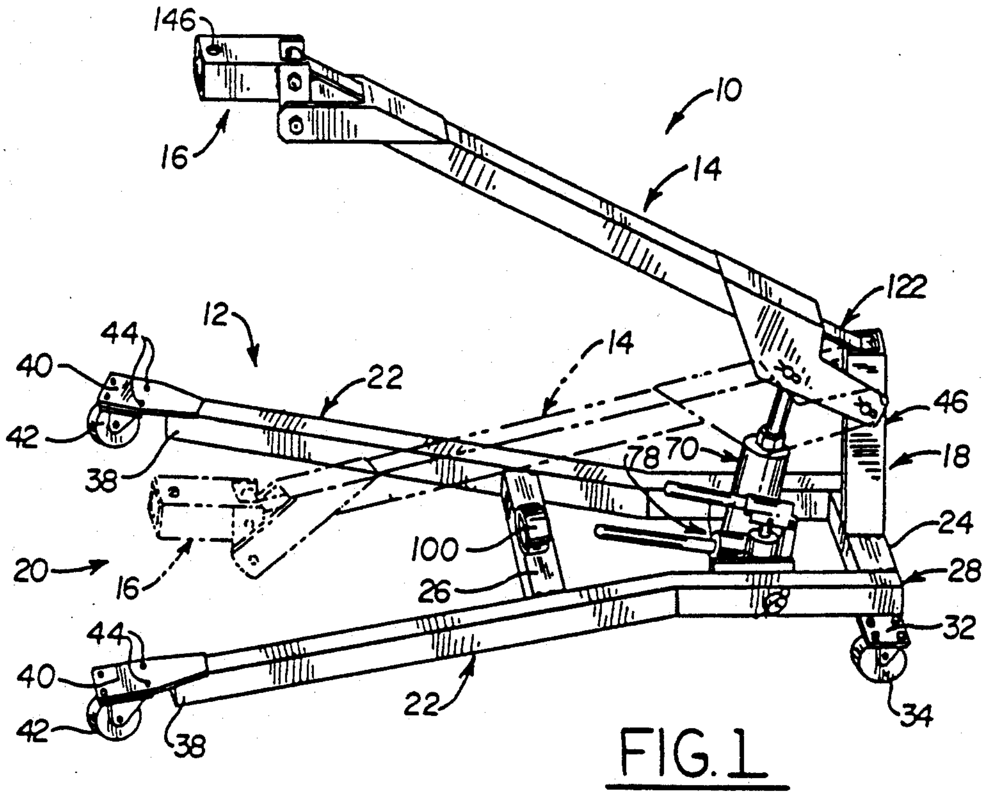
FIG. 1 is a side perspective view of a lifting device of the invention and illustrating a boom thereof in a lower position in phantom lines and in an upper position in solid lines.

Referring now to the drawings in detail, and in particular to FIG. 1, a lifting device, generally indicated by reference numeral 10, comprises a floor-engaging base 12, an articulating boom 14 pivotally mounted to the base, an articulating receiver 16 movably mounted to the arm and a variety of attachments (as hereinafter referenced and described in detail) interchangeably and adjustably mounted, in a universal fashion, to the articulating receiver and adapted to mount a variety of automotive parts.

For convenience in understanding the following description, the device 10 will be referred to as having a front end 18 and a rear end 20. The base 12 is substantially formed by a pair of longitudinal frame members 22 and a pair of transverse frame members 24, 26 rigidly secured to and between the longitudinal frame members substantially at the front end 18 of the device 10. The transverse frame member 24 is secured to and between the longitudinal frame members 22 substantially adjacent front axial ends 28 thereof. The longitudinal frame members 22 are substantially parallel at the front end 18 of the device 10, but are bent at 30 outwardly so as to gradually diverge toward the rear end 20 of the device. This diverging feature of the longitudinal frame members 22 provides the device 10 with a broad base of support for the relatively heavy automotive parts mounted to the boom 14 substantially over the rear end 20 of the device. The transverse frame member 26 is mounted to and between the longitudinal frame members 22 just rearwardly of the bends 30 of the same. In this manner, the transverse frame member 26 rigidifies the longitudinal frame members 22 along transverse axes thereof adjacent the bends 30.

The base 12 is mobile and to this end further comprises a pair of ears 32 rigidly secured to and positioned substantially adjacent the front axial ends 28 of the longitudinal frame members 22 and opposite the transverse frame member 24. Floor-engaging front swivel caster assemblies 34 are securely mounted, as by front bolts 36, to the ears 32. In addition, secured adjacent to and extending rearwardly of rear axial ends 38 of the longitudinal frame members 22 are caster mounting plates 40 to which gear swivel caster assemblies 42 are securely mounted by rear bolts 44. By positioning the ears 32 outwardly of the longitudinal frame members 22, the front portion of the device is wheelable from a much broader base of support than if the caster assemblies 34 were mounted directly to the longitudinal frame members. Similarly, positioning of the mounting plates rearwardly of the longitudinal frame members 22 provides the device with a broad base of support.

Preferably, the longitudinal and transverse frame members 22, 24, 26 are constructed of hollow steel tubes, square, in cross section. In addition, the frame members are preferably rigidly secured together by welding. It is contemplated, however, that the longitudinal and transverse frame members can be mounted together by any suitable mechanical means, such as by a nut and bolt connection. Similarly, the ears 32 and the mounting plates 44 are preferably welded to the longitudinal frame members 22.

Figure 2:
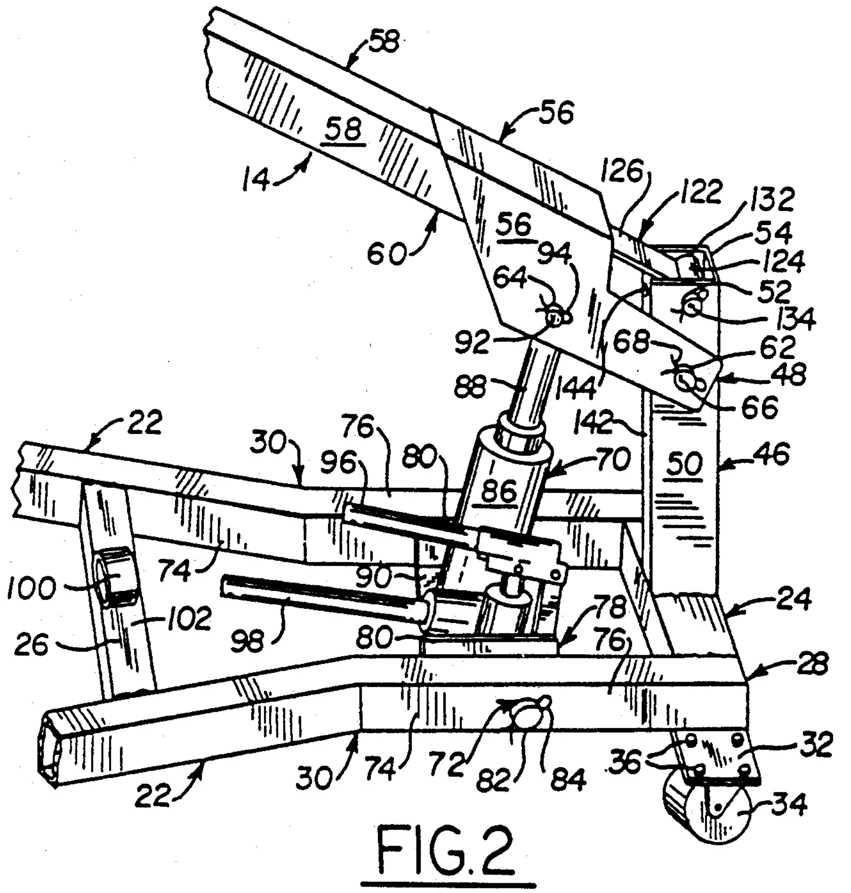
FIG. 2 is an enlarged side perspective view of a front end of the device shown in FIG. 1 and illustrating a pivotal connection between the boom and a mast of the device.

As stated above, the boom 14 is pivotally connected to the base 12, and to this end, the device 10 further comprises, as illustrated in FIGS. 1 and 2, a mast 46 rigidly secured to and positioned centrally on the transverse frame member 24. Like the longitudinal and transverse frame members 22, 24, 26, the boom 14 and the mast 46 are preferably made of tubular, square, in cross section, members. The mast 46 includes a pair of aligned lower holes 48 extending through opposing side walls 50 of the mast and a pair of aligned upper holes 52 extending through the side walls 50 and positioned above lower holes 48 and adjacent upper end 54 of the 20 mast.

The boom 14 comprises a pair of front plates 56 rigidly secured to, as by welding, opposing side walls 58 of the boom, on front portion 60 thereof, and extending forwardly of and-substantially coextensive and parallel with, but lower than, the longitudinal axis of the boom. The front plates 56 include a pair of aligned front holes 62 and a pair of aligned rear holes 64 extending therethrough. The front plates 56 are positioned adjacent and outwardly of the side walls 50 of the mast 46 such that the lower holes 48 thereof are aligned with the front holes 62. A first pin 66 extends through the aligned pairs of lower and front holes 48, 62 to mount the boom 14 to the mast 46. In this manner, the boom 14 is adapted for pivotal movement between an upper position, as illustrated in FIG. 1 in solid lines, and a lower position, as illustrated in the same Figure in phantom lines. The first pin 66 is prevented from disengagement from the holes 48, 62 by first cotter pins 68 extending through holes (not shown) in ends of the first pin.

The front plates 56 of the boom 14 extend forwardly and below the longitudinal axis of the boom 14 so as to, in part, to avoid interference of the front portion 60 of the boom with the upper end 54 of the mast 46 as the boom pivots between the upper and lower positions so as to permit free pivotal movement of the boom relative to-the mast. The front plates 56 also function to add stability to the boom 14 so as to prevent the same from lateral wobble as the boom pivots between the upper and lower positions.

To facilitate pivotal movement of the boom 14, the device 10 further comprises a manually operated hydraulic jack 70 operably connected to and between the base 12 and the boom 14. Specifically, as shown in FIG. 2, each longitudinal frame member 22 includes a pair of corresponding aligned openings 72 extending through opposing sides 74 of parallel sections 76 of the longitudinal frame members at the front end 18 of the device 10. A substantially U-shaped cradle 78 has a pair of aligned openings (not shown) extending through legs 80 of the U-shape, with each opening (not shown) aligned with a respective aligned pair of openings 72 in a corresponding longitudinal frame member 22. The cradle 78 is pivotally mounted to and between the longitudinal frame members 22 by a pair of second pins 82 extending through the sets of aligned openings in the longitudinal frame members 22 and the legs 80. A pair of second cotter pins 84 extend through openings (not shown) in ends of each second pin to prevent disengagement of the second pin from its mounting to the longitudinal frame member 22 and the cradle 78.

The jack 70 is of the conventional manually operated type and comprises a lower cylinder 86 and an upper piston rod 88 extensible mounted to and within the cylinder. The cylinder 86 is securely connected, as by a nut and bolt connection, to bite portion 90 of the U-shaped cradle 78. In this manner, the jack 70 is 20 pivotally connected to the base 12. The piston rod 88 has secured on a top axial end (not shown) thereof a cap (not shown) and a horizontal tube (not shown) rigidly secured to the cap and positioned transversely of the device 10. Ends (not shown) of the tube (not shown) are aligned with and positioned between the aligned rear holes 64 of the front plates 56. A third pin 92 extends through the tube (not shown) and the aligned rear holes 64 to pivotally mount the jack 70 to the boom 14. A pair of third cotter pins 94 extend through openings (not shown) in ends of the third pin 92 to prevent disengagement of the same from the front plates 56. In this manner, the jack 70 is pivotally connected to and between the boom 14 and the base 12 so as to enable the jack to freely rotate on its pivotal connections as the boom is moved between the upper and lower positions.

The jack 70 further includes an actuating handle 96 for 5 extending the piston rod 88 with respect to the cylinder 86, and a valve handle 98 connected to the jack valve (not shown) for releasing the piston rod from its extended position.

Preferably, a jack having a two-ton capacity is employed in connection with the invention. Because of the relatively close proximity of the jack 70 to the pivotal connection between the boom 14 and the mast 46, the jack 70 is at a significant disadvantage and is therefore only able to lift approximately 600 pounds of the boom during operation of the device 10. However, this is thought to be adequate for the lifting of most vehicle parts. Such jack is commercially available from Heins-Warner Company of Waukesha, Wis.

It should be noted that due to the relatively heavy vehicle parts that may be carried by the boom 14, actuation of the valve handle 98 when the boom is in the upper position may cause sudden contraction of the piston rod 88 relative to the cylinder 86. Such rapid contraction may result in an abrupt and forceful engagement of the piston (not shown) with the cylinder 86, possibly damaging the jack. To prevent such damage, a protective loop 100 is mounted to upper central surface 102 of the transverse frame member 26 as by welding. As the boom pivots to the lower position, the same engages the loop 100 to prevent any further contraction of the piston rod 88 and thus abrupt engagement of the piston (not shown) with the cylinder 86.

To mount vehicle parts onto the boom 14, the device 10 is provided with the receiver 16 pivotally mounted on rear portion 104 of the boom 14. The receiver 16 is L-shaped and formed of a vertical leg 106 and a horizontal leg 108, with the legs made of substantially the same tubular square, in cross section, members as the longitudinal and transverse frame members 22, 24, 26, the boom 14 and the mast 46. The horizontal leg 108 provides a mounting means for the numerous automotive part attachments as described hereinafter in detail.

Figure 3:
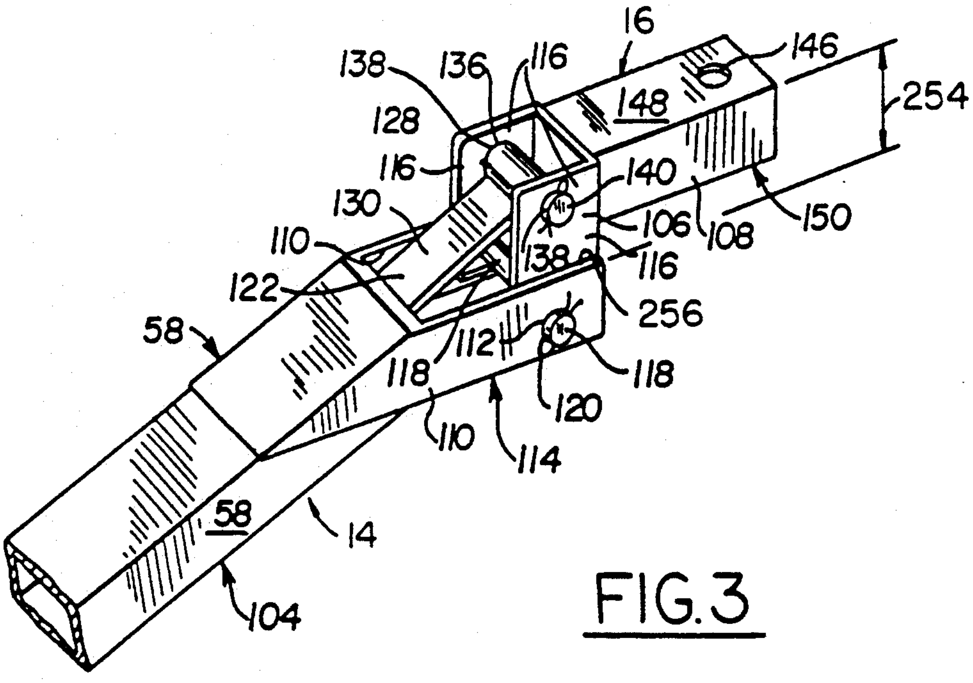
FIG. 3 is an enlarged perspective view of a rear portion of the boom and illustrating a pivotal connection between the boom and a receiver of the device.

A pivotal connection between the receiver 16 and the boom 14 is necessary to permit the horizontal leg 108 of the receiver to maintain a level, substantially horizontal condition as the boom 14 moves between the upper and lower positions so as to maintain a level condition of the vehicle parts mounted to the receiver. To this end, as illustrated in FIG. 3, a pair of rear plates 110 are rigidly secured to, as by welding, the opposing side walls 58 of the boom 14 and extend rearwardly of and are angled downwardly with respect to the rear portion 104 thereof. The rear plates 110 include a pair of aligned bores 112 extending therethrough. The vertical leg 106 of the receiver 16 includes a pair of lower bores 114 extending through opposing sides 116 and aligned with the bores 112 of the rear plates 110. A fourth pin 118 extends through the aligned bores 112, 116 to pivotally mount the receiver 16 to the rear plates 110. A pair of fourth cotter pins 120 extend through holes (not shown) in ends of the fourth pins to prevent disengagement of the same from the aligned bores 112, 116.

To guide the receiver 16 through pivotal movement and maintain the horizontal leg 108 of the same level as the boom pivots between the upper and lower positions, the device 10 is provided with a tie-rod 122 telescopically engaging the tubular boom 14 and pivotally mounted to and between the mast 46 and the 15 receiver 16. As shown in FIGS. 2 and 3, the tie-rod 112 includes a front bearing 124 on a forward end 126 of the tie-rod and a rear bearing 128 on a rearward end 130 of the tie-rod. The front bearing 124 includes a horizontal front bore 132 aligned with the upper holes 52 of the mast 46, and a fifth pin 134 extends through the aligned front bore and upper holes to pivotally mount the tie-rod to the mast. The rear bearing 128 includes a horizontal rear bore 136 aligned with a pair of upper bores 138 extending through the opposing sides 116 of the vertical leg 106 of the receiver 16, and a sixth pin 30 140 extends through the aligned rear bore 136 and upper bores 138 to pivotally mount the tie-rod to the receiver. In this manner, as the boom 14 moves between the upper and lower positions, the receiver pivots on the fourth pin 118, and the horizontal leg of the receiver is maintained in a horizontal condition.

To permit free pivotal movement of the tie-rod 122 with respect to the receiver 16, the vertical leg 106 thereof is provided without top and rear walls. In addition, the position of the rear plates 110 at an angle with respect to the boom 14 permits free movement of the tie-rod 122 with respect to the rear portion 104 of the boom. The tie-rod 122 also pivots about fifth pin 134 without interference with the mast 46 due to the end 54 thereof and rear same being open on the upper wall 142 of the mast having notched out portion 144 on the upper end of the mast. The front portion 60 of the boom 14 is permitted to freely pivot about its pivotal connection due to the forward positioning of the front plates 56 with respect to the boom.

As stated above, the receiver 16 is adapted to adjustably mount a variety of vehicle part attachments, as hereinafter described in detail, and to this end, the horizontal leg 108 of the receiver is provided with a pair of aligned holes 146 extending through opposing upper and lower walls 148, 150 of the horizontal leg and forming a socket therethrough. The socket forms a means for mounting the vehicle part attachments to the boom 14. Each of the vehicle part attachments includes one attachment peg, referenced and described below, adapted to slidably and rotatably engage the aligned holes 146 to mount the attachment to the receiver 16 for adjustable movement about a vertical axis of rotation. Each attachment can further comprise a stop plate, referenced and described below, on the pin means and adapted to engage the upper wall 150 of the horizontal leg 108 of the receiver, when the attachment is mounted to the receiver, to provide a secure mounting of the attachment to the receiver and to assist in relative free rotation of the attachment with respect to the receiver. In this manner, the attachments are not only adjustably mounted to the boom through a horizontal axis of rotation, but they are also mounted to the receiver through a vertical axis of rotation. In addition, as will be described below, the attachments are further adjustable with respect to tilt and other angular adjustment.

Figure 4:
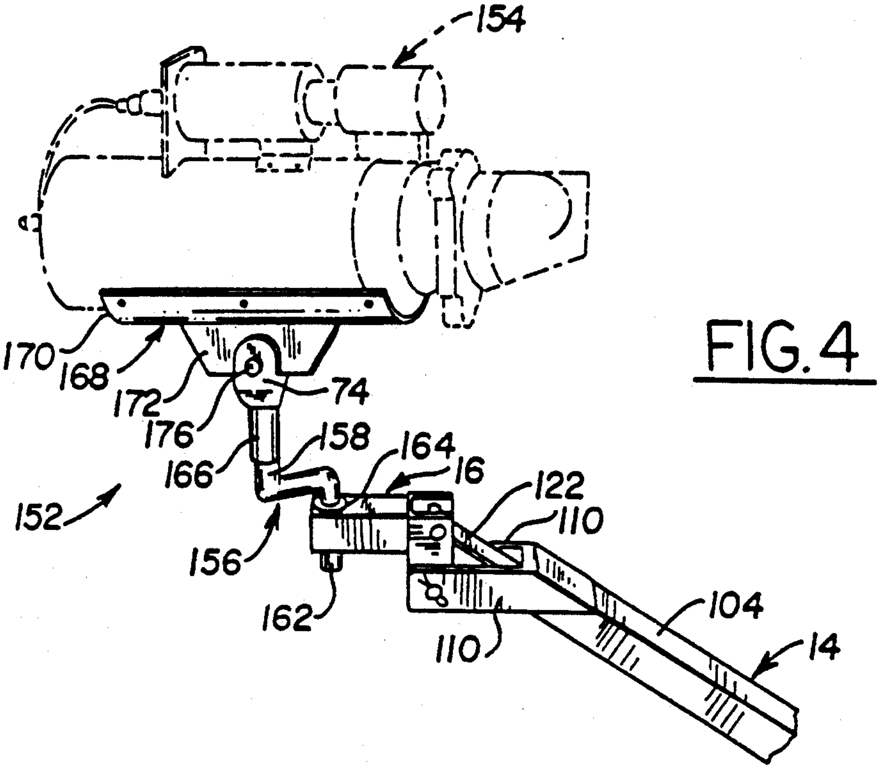
FIG. 4 is a side perspective view of the boom and the receiver shown in FIG. 3 and illustrating a pivotal connection between the receiver and a starter attachment of the device.

As examples, three vehicle part attachments are disclosed herein. It is contemplated, however, that the device 10 can incorporate a number of attachments specific for particular vehicle parts to be removed or installed. As illustrated in FIG. 4, a cradle attachment 152 for supporting a starter 154, illustrated in dotted lines, is adjustably mounted to the receiver 16 by a first adjustment peg 156 slidably and rotatably engaging the aligned holes 146. The first adjustment peg 156 is bent so as to form upper and lower vertical section 158, 160 and a horizontal section 162 intermediate the same. A stop plate 164 is rigidly mounted to the lower vertical section 160 to support the first attachment peg, and thus the cradle attachment 152, to the receiver 16. The horizontal section 162 of the first attachment peg 156 permits rotational adjustment of the cradle attachment through horizontal planes. Thus, the horizontal section 162 functions to extend the rotational radius of the cradle attachment 152 when the peg 156 is rotated with respect to the rear portion of the boom 14. An upper forked collar 166 slidably and securely engages the upper vertical section 158 and rotatably mounts a cradle plate 168. The cradle plate comprises a semicircular plate 170 and a vertically positioned mounting plate 172 rotatably mounted to and between forks 174 of the collar 166 by horizontal bolt provided by the horizontal 176. The pivotal connection bolt 176 permits vertical tilt adjustment of the cradle plate 168. Ordinarily, the cradle plate 168 is adjustably positioned about its pivotal connection on horizontal bolt 178 prior to placing the starter 154 on the cradle. In contrast, pivotal adjustment of the cradle attachment 152 on first attachment peg 156 can occur anytime during removal and installation of the starter and pivotal movement of the boom 14. Further, rotational adjustment of the receiver 16 with respect to the boom 14 necessarily takes place when the same moves between the upper and lower positions. Although the cradle plate 168 illustrated in FIG. 4 is particularly adapted to support the starter 154, other automotive parts, such as steering boxes, air tanks and the 30 like (not shown) can be removed and installed utilizing the cradle attachment 152.

Figure 5:
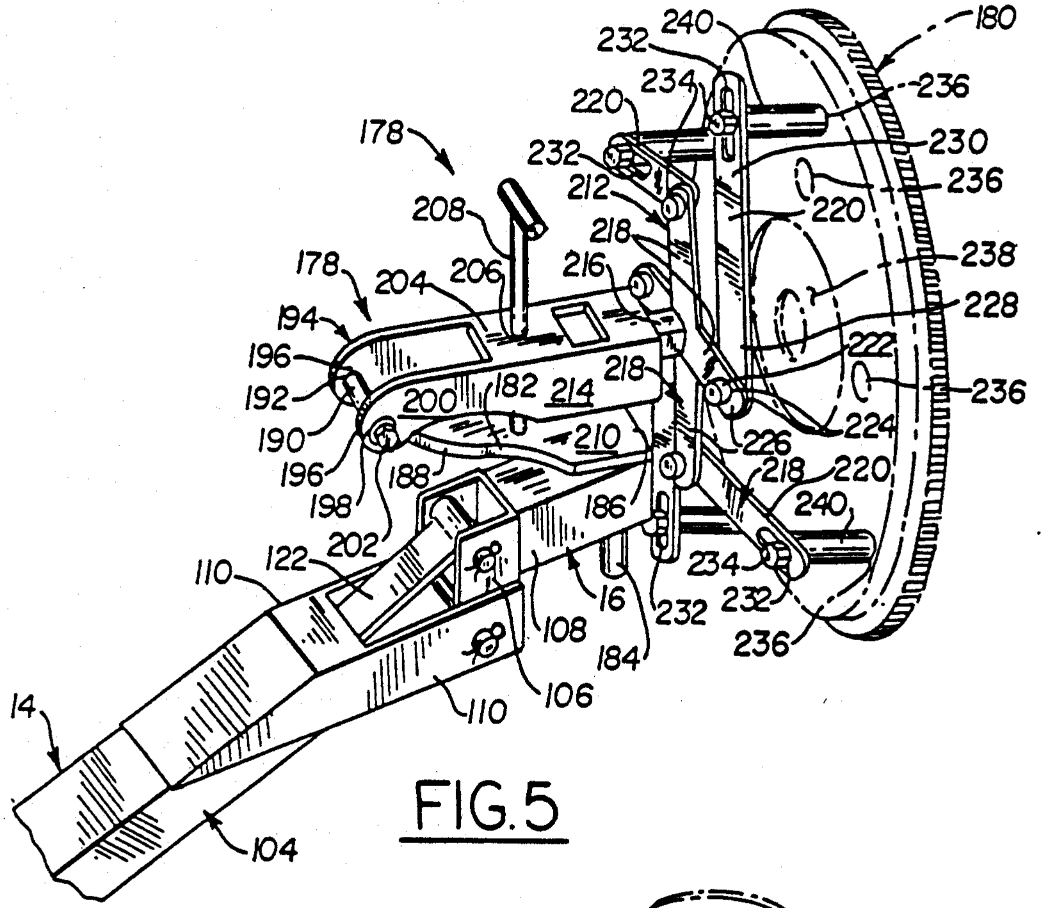
FIG. 5 is a perspective view of the boom and the receiver shown in FIG. 3 and illustrating a pivotal connection between the receiver and a fly wheel attachment of the device.

Referring to FIG. 5, there is shown a flywheel attachment 178 adjustably mounted to the receiver 16 and mounting a flywheel 180 illustrated in dotted lines. Specifically, the attachment 178 includes a lower bracket 182 removably mounted to the receiver 16 by a second attachment peg 184 rigidly secured to and depending downwardly from front 186 of the lower bracket 182 and slidably engaging the aligned holes 146 of the receiver. Back 188 of the lower bracket 182 includes a bearing 190 having a bore 192 extending therethrough. An upper bracket 194 comprises a pair of side plates 196 having a pair of aligned orifices 198 extending through back sides 200 of the side plates. A bracket bolt 202 extends through the aligned bore and orifices 192, 198 to tiltably mount the upper bracket 194 to the lower bracket 182. A horizontal top plate 204 has a threaded bore 206 extending therethrough and is mounted to and between the side plates 196. A threaded T-bolt 208 engages the bore 206 and securely and matingly engages, at all times, due to the weight of the attachment 178 and flywheel 180 mounted thereto, top surface 210 of the lower bracket 182. In this manner, threading of the T-bolt 208 to a greater or lesser extent in bore 206 tilts the upper bracket 194 up and down with respect to the lower bracket 182. Thus, the top plate 204, with its threaded bore 206, and the T-bolt 208 function as a means for 30 adjusting the tilt of the upper bracket 194 relative to the lower bracket 182.

The flywheel attachment 178 further comprises a wheel 212 rotatably mounted to front side 214 of the upper bracket 194 at 216. The wheel 212 is freely rotatable with respect to the upper bracket 194 and includes a plurality of equidistantly spaced arms 218. An equal number of elongated mounting bars 220 are pivotally mounted to the arms 218 by first mounting ends 226 and inner parts 228 bolts 222 extending through aligned slots 224 in outer of the arms and bars, respectively. Outer parts 230 of the mounting bars 220 have extending therethrough elongated slots 232. The flywheel 180 is securely mounted to the attachment 178 by second mounting bolts 234 extending through the elongated slots 232 and flywheel bores 236 aligned with the elongated slots. When the flywheel 180 is mounted to a crankcase (not shown) of the vehicle (not shown), the flywheel bores 236 provide a means through which bolts (not shown) securely mount the flywheel to the crankcase.

In operation of the device, for example, to remove the flywheel 180 from the crankcase (not shown), the attachment 178 is first rotatably mounted to the receiver in the manner stated above. The boom 14 is then raised or lowered, through actuation of handles 96, 98, so as to position the attachment 178, and specifically the wheel 212 and the mounting bars 220, adjacent the flywheel 180. The T-bolt 208 is then turned in an appropriate direction to adjust the attitude of the upper bracket 194, and thus the wheel 212 and the mounting bars 220, to more closely align with the flywheel 180 mounted to the crankcase (not shown). The wheel 212 and the mounting bars 220 are then rotated to align the elongated slots 232 of the bars with an equal number of flywheel bores 236 which are not presently being used for mounting the flywheel to the crankcase. The second mounting bolts 234 are then set through the aligned elongated slots 232 and the flywheel bores 236 to mount the flywheel 180 to the attachment 178. Once so mounted, the flywheel 180 can be removed from the crankcase by removing bolts (not shown) extending through other flywheel bores 236. The flywheel 180 can then be wheeled away on the device 10 to a work or other area for disposal or repair. Installation of a new or repaired flywheel is performed by substantially following the foregoing steps but in the reverse order.

The pivotal mounting of the wheel 212 and the mounting bars 220 to the upper bracket 194 and the wheel arms 218, respectively, and the employment of elongated slots through which second mounting bolts 234 extend permit adjustment of the attachment 178 so as to mount flywheels of a variety of size and shape and having flywheel bores set in various configurations.

Due to the flat, disc-like shape of many flywheels (for example, the flywheel 180 illustrated in FIG. 5) a means to mount the flywheel to the mounting bars 220, in spaced relationship thereto, is required in order to permit access to a space 238 adjacent the flywheel to perform operations necessary to the installation and removal of the flywheel with respect to the crankcase (not shown). Such space is necessary to, for example, remove or install second mounting bolts 234 through the aligned slots and bores 232, 236 as described above. To this end, as illustrated in FIG. 5, a plurality of spacer tubes 240 are mounted to and between the flywheel 180 and the mounting bars 220 and the second mounting bolts 234 extend through the tubes to mount the flywheel to the attachment 178. In this manner, the tubes 240 function to mount the flywheel 180 to the attachment 178 in spaced relationship thereto. The spacer tubes 240 are not required when mounting flywheels of concave shape because such shape provides sufficient space between the flywheel and the attachment 178 to perform the above-stated installation and removal operations.

Although the flywheel attachment 178 is particularly adapted for mounting flywheels 180, the attachment can also be employed for installation or removal of flywheel housings (not shown) and bell housings (not shown). These automotive parts can be mounted to the attachment 178 in the same manner as that described above with respect to flywheel 180 by second mounting bolts 234 extending through the elongated slots 232 and aligned bores (not shown) within the flywheel and bell housings (not shown).

Figure 6:
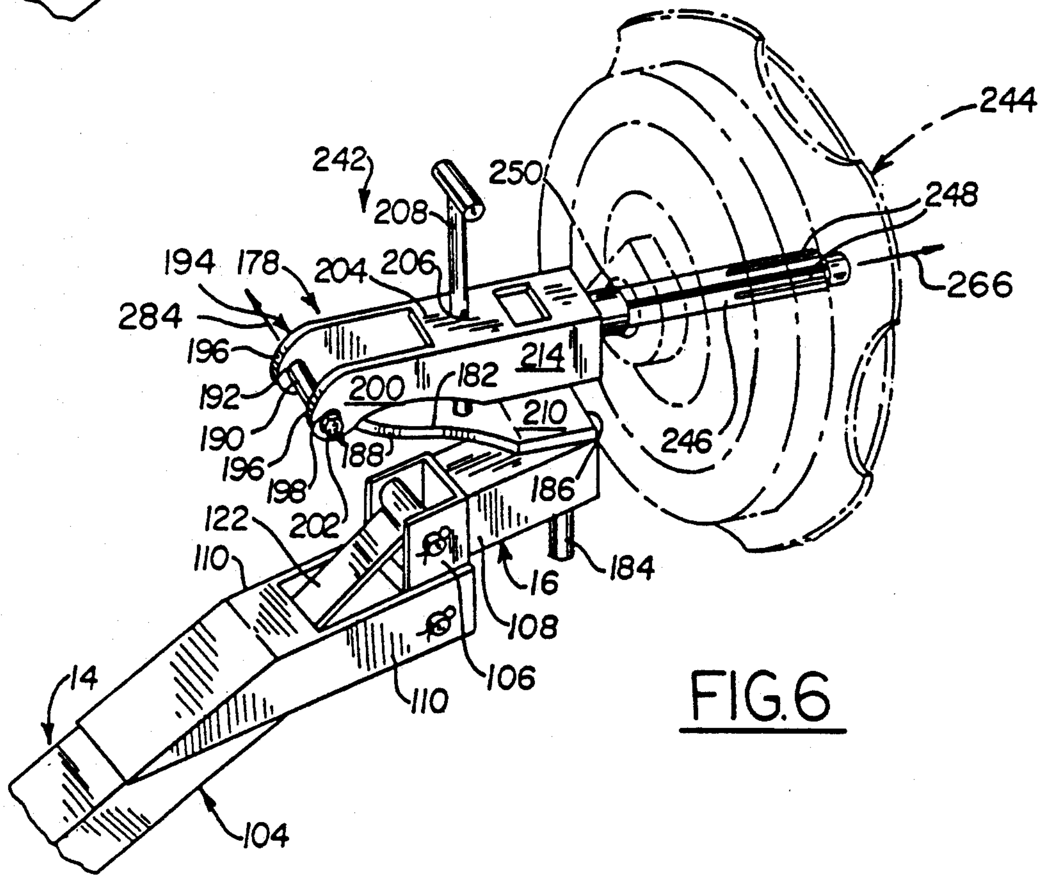
FIG. 6 is a perspective view of the boom and the receiver shown in FIG. 3 and illustrating a pivotal connection between the receiver and a clutch attachment of the device.

In FIG. 6 there is shown a clutch attachment 242 adjustably mounted to the receiver 16. A clutch 244 (mounted to the attachment 242) is illustrated in dotted lines. The attachment 242 is identical to the fly wheel attachment 178, except that the clutch attachment 242 includes an elongated mounting rod 246 rotatably mounted on the front side 214 of the upper bracket 194 instead of the wheel 212 and the mounting bars 220. The clutch attachment 242 illustrated in FIG. 6 therefore comprises substantially the same component parts as the fly wheel attachment shown in FIG. 5. Accordingly, FIG. 6 is provided with substantially the same reference numerals as those shown in FIG. 5.

The elongated mounting rod 246 is substantially circular, in cross-section, and has extending along substantially longitudinal axes of the rod a series of external splines 248. The mounting rod 246 is substantially identical to a splined rod (not shown) of a transmission (not shown). When the clutch 244 is mounted to the transmission, the internal splines of the clutch 244 mate with the external splines (not shown) of the splined transmission rod (not shown). Thus, the mounting rod 246 is adapted to mount to the clutch 244 in the same manner in which the clutch mounts to the transmission (not shown).

In operation of the device 10 to, for example, remove the clutch 244 from a fly wheel of a vehicle (not shown), the transmission (not shown) is first removed from engagement with the clutch by removing the splined rod (not shown) of the transmission from mating engagement with the internal splines (not shown) of the clutch. Subsequently, the attachment 242 is rotatably mounted to the receiver in the same manner as the flywheel attachment 178 is rotatably mounted to the receiver as shown in FIG. 5. The boom 14 is then raised or lowered, through actuation of the jack handles 96, 98, so as to position the clutch attachment 246, and specifically the mounting rod 246, adjacent the clutch 244. The T-bolt 208 is then turned in an appropriate direction to adjust the attitude of the bracket 194 to more closely align the mounting rod 246 with the clutch 244. The rod 246 is then rotated with respect to the receiver 16 so as to align the external splines 248 of the rod with internal splines (not shown) within a bore 250 of the clutch 244. The mounting rod 246 is then set in engagement with the clutch 244 such that the external splines of the former mate with the internal splines of the latter. Once so mounted, the clutch can be detached from the flywheel and subsequently wheeled on the device to a work or other area for disposal or repair. Installation of a new or repaired clutch is performed by substantially following the foregoing steps but in the reverse order.

Figure 7:
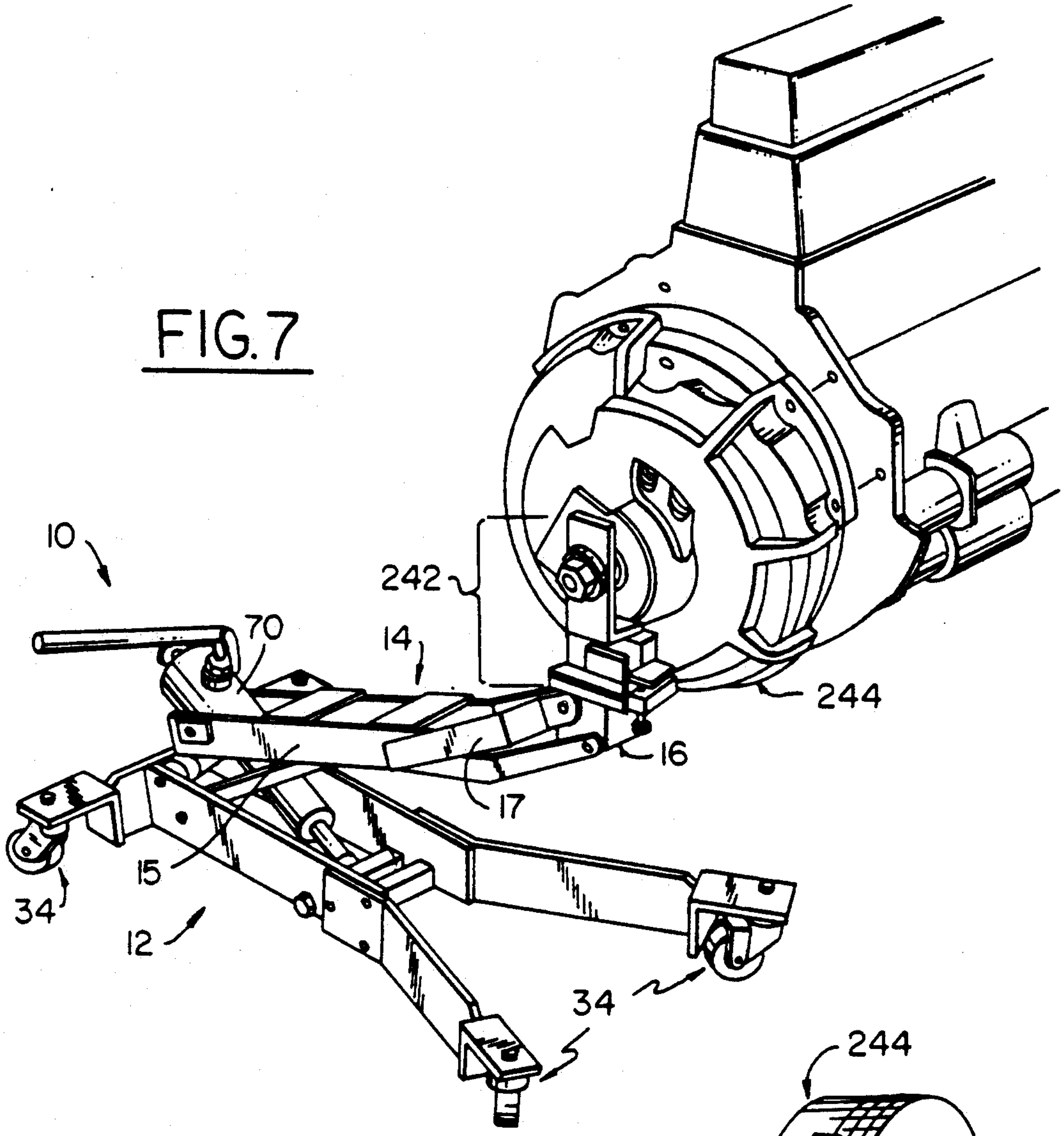
FIG. 7 is a perspective view of a second embodiment of the lifting device of the present invention shown in the environment of an engine and an engine clutch.
Figure 8:
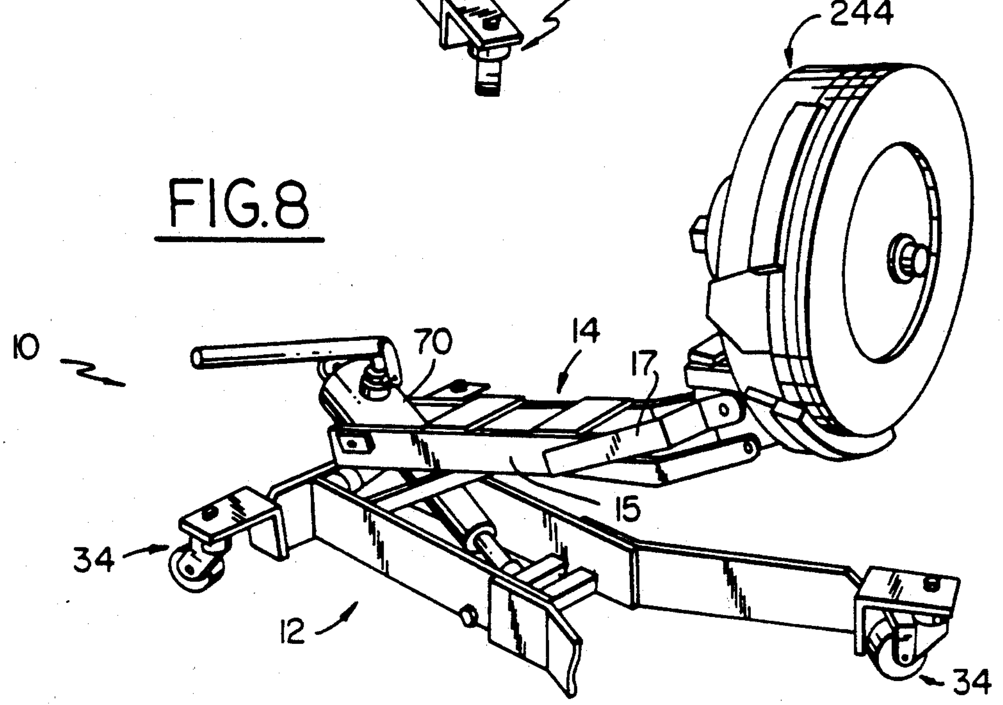
FIG. 8 is a perspective view of the device of FIG. 7 shown with an engine clutch mounted thereto in a vertical orientation.
Figure 9:
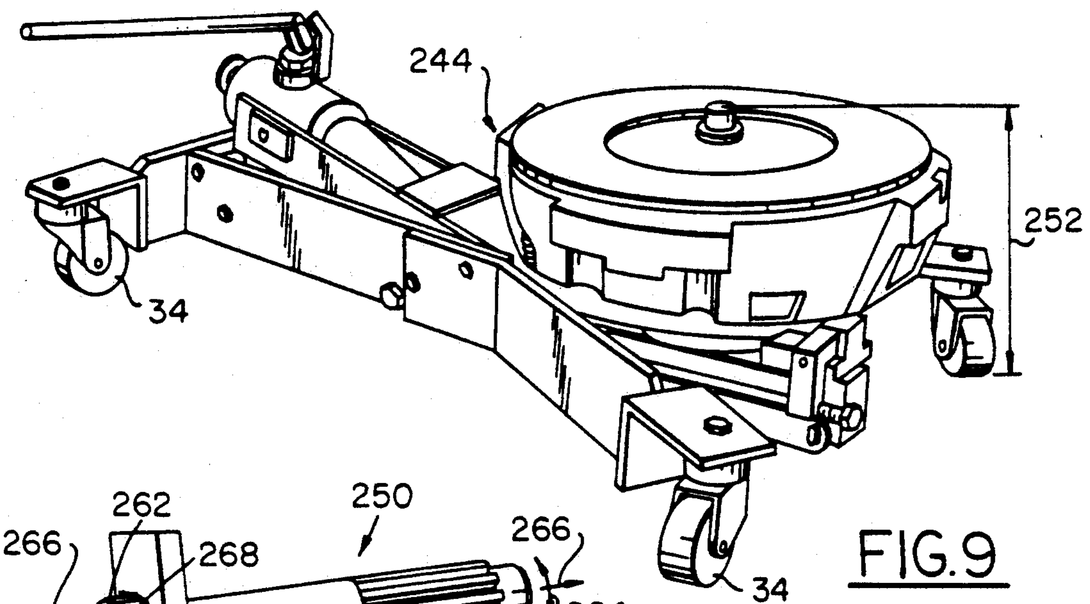
FIG. 9 is a perspective view of the device of FIG. 7 shown with an engine clutch lowered in a horizontal orientation.

Now referring to FIG. 7, a second embodiment of the device of the present invention includes base 12, boom 14, and- hydraulic cylinder (or jack) 70. The second embodiment of the lifting device of the present invention is generally similar to the first embodiment disclosed in FIGS. 1-6 except is includes the following: 1) an improved boom arm, 2) a low profile receiver block design, and 3) an improved clutch attachment apparatus. Each of the three above referenced improvements will now be described in detail.

IMPROVED BOOM ARM

Now referring to FIGS. 1, 2, 7, 8, and 9, in the first embodiment (FIGS. 1 and 2), boom 14 comprises a substantially straight member constructed from rectangular tubing. Although this design is functional for achieving the lowering and raising of a vehicle component, it is not an optimal design. Specifically, when using a lifting device, it is common for obstructions (such as gas tanks and other vehicle appendages) to restrict the maneuverability of the lifting device. It was discovered, during actual testing of the first embodiment, that the "strait" design of boom 14 made it difficult to use lifting device 10 in some applications. To overcome these difficulties, boom 14 was designed with a crook (or bend) midway its length. Thus, in the second embodiment of boom 14 shown in FIGS. 7-9, boom 14 is comprised of first and second segments 15, 17 which are joined at an obtuse angle. This arrangement allows boom 14 to maneuver around various vehicle obstructions (such as fuel tanks and the like) more easily than the "straight" (or non-angled) embodiment depicted in FIGS. 1 and 2.

An additional benefit of bending boom 14 is that a lower vertical profile 252 (see FIG. 9) is obtained as compared to the vertical profile which is achievable using the boom design of the first embodiment. This low-vertical profile is made possible primarily because the rearward portion 17 of boom 14 hugs the floor more closely than the first embodiment of boom 14 will allow. As was mentioned earlier, with lifting devices of this nature, it is highly desirable to achieve the most compact vertical profile. A low-verticle (low overall height) provides two primary advantages. Firstly, it allows the clutch 244 to be loaded onto clutch attachment apparatus 242 while the lifting device 10 resides next to the truck. Then, the lifting device 10 can be rolled under the truck with clutch 244 mounted thereon. If a lifting device cannot achieve a sufficiently low-verticle profile to enable a mechanic to maneuver the lifting device under a truck with a clutch loaded thereon, the mechanic must maneuver the clutch under the vehicle, then maneuver the lifting device under the vehicle, then, while under the vehicle, maneuver the clutch onto the lifting device. Because of the characteristic weight of truck clutches and other cumbersome characteristics associated therewith, this method, at best, is extremely arduous and inconvenient, and at worst is dangerous. Secondly, a device which achieves a low-verticle profile eliminates the need of significantly elevating the truck. Mechanics generally prefer not to elevate the truck significantly while installing clutches, or the like. This preference is born primarily from the safety risks associated with working beneath an elevated vehicle.

LOW PROFILE RECEIVER BLOCK DESIGN

Figure 10:
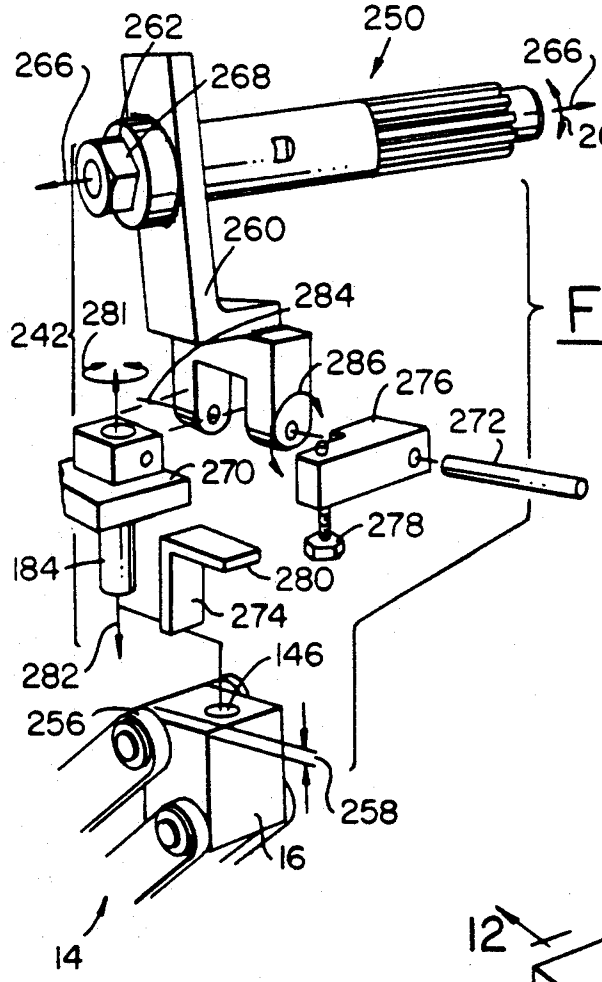
FIG. 10 is an exploded view of a second embodiment of the clutch attachment apparatus of the present invention.
Figure 11:
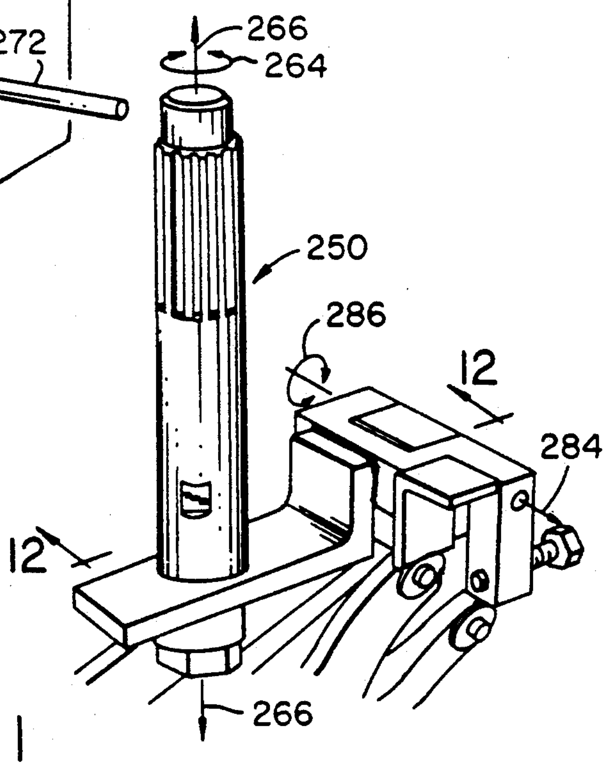
FIG. 11 is a perspective view of the clutch attachment apparatus of FIG. 10 wherein the spline shaft is shown in its vertical orientation.
Figure 12:
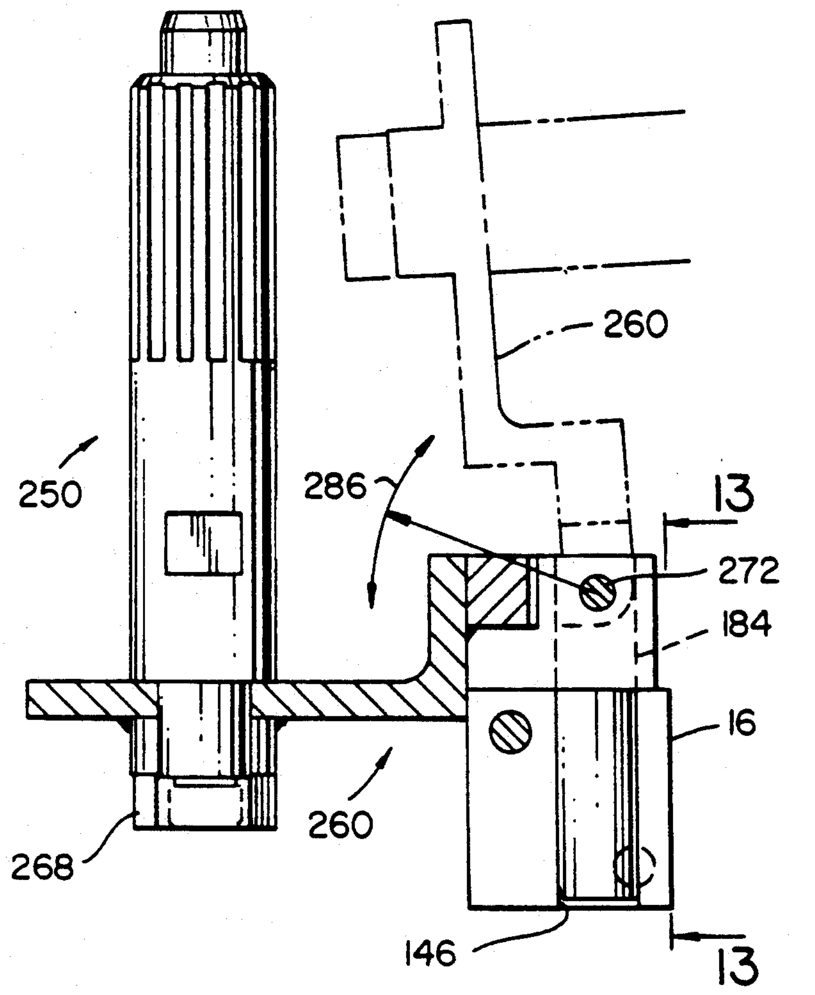
FIG. 12 is a partial cross-sectional view taken substantially along lines 12—12 of FIG. 11.
Figure 13:
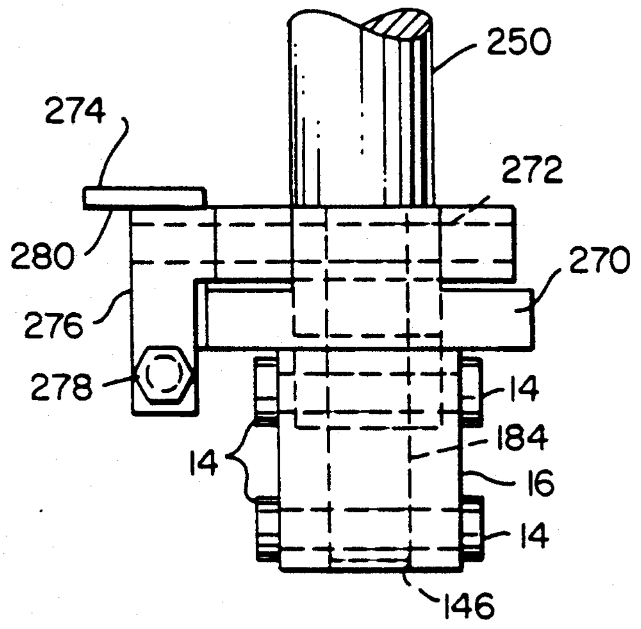
FIG. 13 is a side view taken substantially along lines 13—13 of FIG. 12.

Although the above discussed improved boom 14 does allow for a more compact vertical profile 252 (see FIG. 9), other features of the second embodiment of lifting device 10 also contribute to the more compact vertical profile. One of these features is the redesign of the receiver block 16 portion of boom 14. To understand the benefits of this improved design, it is beneficial to review the receiver block design of the first embodiment (see FIG. 3). Now referring to FIG. 3, in the first embodiment, receiver 16 resides substantially above 254 an upper most portion 256 of boom 14. This upper most extension 254 of receiver 16 above portion 256 has been eliminated in the second embodiment of the present invention shown in FIG. 10. Thus, as seen in FIG. 10, receiver 16 resides generally below 258 the upper most portion 256 of boom 14. Thus, when comparing the dimension 254 of FIG. 3 to the dimension 258 of FIG. 10, it is easily seen that when boom 14 of the lifting device of the present invention is maneuvered into its lowest most position, the improved receiver block design of FIG. 10 allows a lower overall vertical profile 252 than that profile which is possible with the design of FIG. 3.

IMPROVED CLUTCH ATTACHMENT APPARATUS

Now referring to FIG. 10, the second embodiment of clutch attachment apparatus 242 has been improved over the first embodiment shown in FIG. 6. The improved clutch attachment apparatus of the present invention, includes spline shaft 250 which is rotatingly coupled to yoke 260. This rotatable coupling between shaft 250 and yoke 260 is made possible by providing a slip fit between receiving bore 262 of yoke 260 and the mating portion of shaft 250. Thus, by providing a slip f it between bore 262 and shaft 250, shaft 250 is easily rotatable 264 about axis 266 of shaft 250. This rotational feature of the clutch attachment apparatus of the present invention is an important aspect of the present invention. Specifically, it allows spline shaft 250 to cooperatively engage the spline portion of the vehicle clutch while the clutch is attached to the vehicle. Without the benefit of this rotational features, other cumbersome methods would have to be employed (such as rotating the vehicle flywheel) to obtain cooperative engagement between shaft 250 and the shaft engaging portion of a clutch (not shown).

Shaft 250 is provided with a threaded end which is received through bore 262 and retained therein by way of nut 268. Thus, it is seen, that shaft 250 is not permanently affixed to yoke 260 but is easily removed therefrom. Thus, the design of the present invention allows many different clutch designs to be accommodated by clutch attachment apparatus 242 of the present invention simply by affixing the appropriately design shaft 250 to yoke 260.

Yoke 260 is pivotally attached to base 270 by way of pivot pin 272. This pivoting motion 286 between yoke 260 and base 270 allows shaft 250 to pivot between a vertical orientation (see FIGS. 9, 11, 12, and 13) and a horizontal orientation (see FIGS. 7, 8, 10, and 12). When shaft 250 is placed in its vertical orientation, clutch 244 is much easier to load onto spline shaft 250. This is so because when spline shaft 250 is placed in its vertical position, clutch 244 is lifted, one piece at a time, and placed down over shaft 250 onto clutch attachment apparatus 242. Because clutch part 244 are placed down onto spline shaft 250, lifting device 10 is stable and does not tend to move or shift.

If shaft 250 were not maneuverable into a vertical position, clutch 244 would have to be moved against shaft 250 with a horizontal force. Although it is possible to load clutch 244 onto shaft 250 in this manner, it is a very cumbersome operation. The difficulty in manipulating clutch 244 in this way arises because as clutch 244 is moved horizontally against shaft 250 the entire lifting device tends to move away from the mechanic. Thus, it becomes necessary to have a second person restrain lifting device 10 while clutch 244 is mounted upon horizontal shaft 250. This movement can be reduced, but not eliminated, by providing locks on castors 34.

Not only is the pivoting motion 286 of shaft 250 advantageous for the above discussed purposes, it also provides a benefit when maneuvering clutch 244 underneath a vehicle. Specifically, a much lower overall height 252 is attainable with clutch 244 in the flat position (flat position depicted in FIG. 9). In the flat position, the second embodiment of the lifting device of the present invention is capable of attaining a height 252 of 13 inches or less. If, shaft 250 were not capable of assuming a vertical orientation, the clutch would have to be maneuvered in its upright position (upright position depicted in FIG. 8) and the minimum achievable height could be no less than the diameter of clutch 244. For truck applications clutch diameter 244 is commonly 17 to 18 inches. Thus, by allowing shaft 250 to pivot between horizontal and vertical orientations, an improved lifting device is provided having superior maneuverability characteristics.

As was mentioned earlier, a low overall vertical height a very desirable feature because it allows clutch 244 to be loaded onto clutch attachment apparatus 242 next to the truck, then, lifting apparatus 10 can be maneuvered under the truck without necessitating raising the truck significantly. If a lifting device cannot be used in this manner, the mechanic must maneuver the lifting device under the truck, then must maneuver the clutch 244 under the truck and then separately load the clutch onto the clutch tool under the truck. Because of the weight and other cumbersome characteristics of truck clutches, this method, at best, is extremely arduous and inconvenient and at worst is dangerous.

Stop block 274 is attached to, by way of welding, base 270. Adjustment arm 276 is attached to, by way of welding, yoke 260. Adjustment arm 276 employs adjustment bolt 278 which passes through adjustment arm 276 and is threadedly engaged therein. Adjustment bolt 278 is adapted to cooperatively engage with undersurface 280 of stop block 274. Thus, by rotating bolt 278 against undersurface 280, the horizontal orientation 286 of axis 266 can be altered. Thus, a clutch which is mounted onto shaft 250 can be adjusted to closely match the angle of the engine block that the clutch is going to be removed from or placed onto.

Although welding may be employed as a means of attaching stop block 274 to base 270 and also attaching adjustment arm 276 to yoke 260, it is understood that other fastening techniques may work equally as well. Also, it is understood that it is possible to combine the function of stop block 274 and base 270 into a single member. Such a single member may be constructed by conventional machining techniques or constructed using metal casting techniques. It is also understood that the function of adjustment arm 276 in conjunction with yoke 260 may be combined into a single working member. Such a working member may be constructed from conventional machine techniques or it may be constructed using metal casting techniques.

Pin 184 extends downwardly from base 270 and is welded thereto. Pin 184 is adapted to freely move within receiver socket 146 thereby allowing clutch attachment apparatus 242 to freely pivot 281 about vertical axis 282. The pivoting of clutch attachment apparatus 242 about vertical axis 282 is an important feature of the present invention. Thus, in applications where it is impractical or impossible to place lifting device 10 directly behind a vehicle engine, device 10 may be manipulated perpendicularly (see FIG. 7) to the engine and still function to raise and lower clutch 244 into and out of position. If clutch attachment apparatus 242 did not have the capability of pivoting about vertical axis 282, lifting device 10 would have to assume a position directly behind the engine being serviced. That limitation would reduce the number of applications in which the lifting device could be used. An additional benefit provided by pivoting clutch attachment apparatus 242 about vertical axis 282 is that it allows the mechanic to make fine adjustments between the alignment of clutch 244 and the engine being serviced. Thus, when clutch 244 is in the process of being installed, or being removed, the mechanic does not have to move the entire lifting device 10 in order to gain proper alignment between clutch 244 and the engine being serviced.

In the first embodiment of the clutch attachment apparatus 242 shown in FIG. 6, the longitudinal axis of shaft 248 is generally in line with (or intersects) pivotal axis 284 created about bolt 202. In contrast, the second embodiment of clutch apparatus 242 shown in FIGS. 10–13 places axis 284 below axis 266. Thus, when shaft 250 resides in its vertical orientation, a much lower vertical height 252 is achievable with clutch apparatus 242 of FIG. 10 than that which is achievable with the design of FIG. 6. Another advantage of clutch attachment apparatus 242 of FIG. 10 over that of FIG. 6 is that when shaft 250 of FIG. 10 is placed in its vertical most orientation, it is stable and does not easily fall into its horizontal orientation. Accordingly, no mechanism is required to maintain it verticaly. The same cannot be said for the design of FIG. 6. Specifically, when shaft 250 of FIG. 6 is placed in its vertical most orientation it is easily seen that shaft 250 will have a propensity to pivot about axis 284 to assume its horizontal orientation. Thus, to prevent this from inadvertantly occurring, top plate 204 of FIG. 6 must be positively restrained to maintain shaft 250 in its vertical orientation.

The foregoing detailed description shows that the preferred embodiments of the present invention are well suited to fulfill the objects of the invention. It is recognized that those skilled in the art may make various modifications or additions to the preferred embodiments chosen here to illustrate the present invention without departing from the spirit of the present invention. Accordingly, it is to be understood that the subject matter sought to be afforded protection thereby should be deemed to extend to the subject matter defined in the appended claims, including all equivalents thereof.

What is claimed is:

1. A clutch installation device for facilitating removal and installation of vehicle clutches comprising:

a base, a boom having front and rear portions, said boom mounted at said front portion to said base for pivotal movement about a horizontal axis of rotation, means mounted between said base and said boom for effecting pivotal movement of said boom about said first horizontal axis of rotation, spline engagement means mounted to said rear portion of said boom for engaging a splined portion of said vehicle clutch, wherein said spline engagement means includes a longitudinal axis and means coupled to said boom for rotating said spline engagement means about said longitudinal axis thereby allowing said spline engagement means to be rotated about said longitudinal axis to engage said splined portion of said vehicle clutch.

2. The clutch installation device of claim 1, wherein said boom is comprised of first and second sections wherein said first and second sections are joined at an obtuse angle.

3. The clutch installation device of claim 1, wherein said spline engagement means includes hinge means connected between said rear portion of said boom and said spline engagement means, wherein said hinge means permits said spline engagement means to pivot about said rear portion of said boom between first and second positions, said first position facilitating placing said clutch on said spline engagement means and said second position facilitating installing said clutch in a vehicle.

4. The clutch installation device of claim 3, wherein said first position includes said longitudinal axis positioned substantially vertically and wherein said second position includes said longitudinal axis positioned substantially horizontally.

5. The clutch installation device of claim 1, wherein said hinge means is pivotally connected to said rear portion of said boom, wherein said pivotal connection allows said spline engagement means to pivot about a substantially vertical axis.

6. A device for facilitating removal and installation of vehicle components comprising:

a base, a boom having front and rear portions, said boom mounted at said front portion to said base for pivotal movement about a horizontal axis of rotation, means mounted between said base and said boom for effecting pivotal movement of said boom about said horizontal axis of rotation, receiver means mounted to said rear portion of said boom for engaging an attachment apparatus, wherein said receiver means and said rear portion of said boom both include an upper most portion, and wherein said upper most portion of said receiver means resides generally below said upper most portion of said rear portion of said boom.

7. The device of claim 6, wherein said boom is comprised of first and second sections wherein said first and second sections are joined at an obtuse angle.

8. The device of claim 7, wherein said receiver means is adapted to interchangeably mount any one of a plurality of attachment apparatuses.

9. The device of claim 6, wherein one of said plurality of attachment apparatus includes a splined shaft.

10. The device of claim 9, wherein said splined shaft hingedly connected to said receiver means wherein said splined shaft is adapted to pivot about said hinge connection between first and second positions, said first position facilitating placing the clutch on said splined shaft and said second position facilitating installing said clutch in a vehicle.

11. The device of claim 6, wherein said receiver weans is pivotally connected to said rear portion of said boom.

12. The device of claim 11, further including leveling means pivotally connected between said receiving means and said base for maintaining said receiver means in a substantially horizontal condition as said boom pivots about said horizontal axis of rotation.

13. The device of claim 6, wherein said receiver means includes a substantially vertical socket formed therein for engaging said attachment apparatus.

14. A clutch installation device for facilitating removal and installation of vehicle clutches comprising:

a base, a boom having front and rear portions, said boom mounted at said front portion to said base for pivotal movement about a first horizontal axis of rotation, means mounted between said base and said boom for effecting pivotal movement of said boom about said first horizontal axis of rotation, spline engagement means mounted to said rear portion of said boom for engaging a splined portion of said vehicle clutch, wherein said spline engagement means is hingedly connected to said rear portion of said boom wherein said spline engagement means is adapted to pivot about said hinge connection between first and second positions, said first position facilitating placing said clutch on said spline engagement means and said second position facilitating installing said clutch in a vehicle.

15. The clutch installation device of claim 14, wherein said boom is comprised of first and second sections wherein said first and second sections are joined at an obtuse angle.

16. The clutch installation device of claim 14, wherein said spline engagement means includes a splined shaft having a longitudinal axis and wherein said first position includes said longitudinal axis positioned substantially vertically and wherein said second position includes said longitudinal axis positioned substantially horizontally.

17. The clutch installation device of claim 14, wherein said spline engagement means is pivotally connected to said rear portion of said boom, wherein said pivotal connection allows said spline engagement means to pivot about a substantially vertical axis.

18. The clutch installation device of claim 14, wherein said spline engagement means is adpated to rotate about a second horizontal axis of rotation thereby allowing said spline engagement means to engage said splined portion of said vehicle clutch.

19. The clutch installation device of claim 14, wherein said spline engagement means is easily disengaged from said rear portion of said boom for facilitating servicing different clutch designs.

20. The clutch installation apparatus of claim 14 wherein said spline engagement means further includes first and second stop means for limiting the pivot range of said spline engagement means between said first and second positions.

* * * * *

UNITED STATES PATENT AND TRADEMARK OFFICE

CERTIFICATE OF CORRECTION

PATENT NO. : 5,251,875

DATED : 10/12/93

INVENTOR(S) : Craychee, et al.

It is certified that error appears in the above-identified patent and that said Letters Patent is hereby corrected as shown below:

Col. 16, line 30, change "weans" to --means--.

Signed and Sealed this

Twenty-ninth Day of March, 1994

Attest:

BRUCE LEHMAN

*Attesting Officer* *Commissioner of Patents and Trademarks*